United States Patent [19]

Jørgensø

[11] 4,117,061
[45] Sep. 26, 1978

[54] METHOD OF MAKING A LAMINATED CONTAINER CONSISTING MAINLY OF THERMOPLASTIC MATERIAL

[76] Inventor: Torben Jørgensø, Vester Alle 5, Strandhuse, DK-6000 Kolding, Denmark

[21] Appl. No.: 735,202

[22] Filed: Oct. 26, 1976

[30] Foreign Application Priority Data

Oct. 31, 1975 [DK] Denmark .............................. 4928/75

[51] Int. Cl.² ....................... B29C 17/04; B29C 17/07
[52] U.S. Cl. ....................................... 264/89; 264/92; 264/94; 264/97; 264/98; 425/388; 425/503; 425/504; 425/523; 156/287; 156/292
[58] Field of Search ....................... 264/89, 90, 92, 93, 264/94, 96–99, 248, 255; 425/388, 503, 504, 522, 523; 156/287, 292

[56] References Cited

U.S. PATENT DOCUMENTS

| 3,091,000 | 5/1963 | Makowski | 264/97 |
| 3,113,831 | 12/1963 | Coale | 264/89 |
| 3,943,219 | 3/1976 | Aoki | 425/523 X |

FOREIGN PATENT DOCUMENTS

| 77,173 | 1962 | France | 264/98 |
| 1,369,535 | 1964 | France | 264/90 |
| 954,820 | 4/1964 | United Kingdom | 425/388 |
| 993,054 | 5/1965 | United Kingdom | 264/94 |
| 1,325,726 | 8/1973 | United Kingdom | 264/92 |
| 1,329,257 | 9/1973 | United Kingdom | 264/97 |

*Primary Examiner*—Jan H. Silbaugh
*Attorney, Agent, or Firm*—Watson, Cole, Grindle & Watson

[57] ABSTRACT

To produce a laminated container consisting mainly of thermoplastic materials, an outer container element consisting of material having desired barrier properties is first vacuum moulded from thin foil or film material in a vacuum mould, and thereafter an inner container element is blow moulded in the same mould with the outer container element present therein. To carry out this method, a mould is provided which consists mainly of two vacuum mould halves which are closable upon an intermediary plate in the vacuum moulding step and directly closable upon one another in the blow moulding step.

6 Claims, 4 Drawing Figures

METHOD OF MAKING A LAMINATED CONTAINER CONSISTING MAINLY OF THERMOPLASTIC MATERIAL

BACKGROUND OF THE INVENTION

This invention relates to a method of making a laminated container consisting mainly of thermoplastic material, comprising the steps of first forming an outer container element and then forming an inner container element by blowing within said outer container element.

For many purposes it is desirable to use laminated containers made from materials which cannot be coextruded.

This applies to e.g. food containers which should be impervious to volatile substances, radiation, etc.. When making such containers, it is desirable to combine a generally rather expensive plastics material possessing the necessary barrier properties with a cheaper material having suitable mechanical properties, e.g. polyethylene and polystyrene, and frequently such materials are incompatible.

It is well known to make a laminated thermoplastic container by a method comprising the steps of preparing a first container element of a thermoplastic material by conventional moulding, allowing said first container element to cool, positioning the cooled first container element in a holder and using said first container element as a mould for blow moulding a second container element within said first container element, the two container elements being united to form a laminated container during the blow moulding operation.

This known method is complicated and labour consuming and is unsuitable for automated production, because it is based on several separate operations.

Furthermore, this known method is based on the condition that the first container element can be transferred to and positioned in a holder in which the blow moulding of the second container element takes place. Thus, the first container element should have a minimum weight, thickness and/or rigidity. Thus, the selection of materials is limited when using said known method, and in order to fulfill the necessary conditions it may be necessary to use more thermoplastic material than actually required to obtain a container having the desired properties. Thus, in order to obtain satisfactory barrier properties, it is ordinarily sufficient to use an outer container element made from a thin film.

SUMMARY OF THE INVENTION

The object of the invention is to provide a method which is simpler, requires less thermoplastic material and which is more suitable for full scale production of laminated thermoplastic containers than the above discussed know method.

According to the invention, in a method as set forth in the opening paragraph, said outer container element is made in a first moulding step by vacuum moulding in a vacuum mould, and the blow moulding of the inner container element then takes place in a second moulding step within the same mould with the already moulded outer container element present therein in close contact with its wall.

As contrasted to the known method above described, the method of the invention does not require that a pre-formed outer container element be positioned in a holder before the inner container element is moulded. Thus, it is sufficient to introduce into the vacuum mould a foil or film material which is then vacuum moulded so as to form the outer container element, and as soon as said outer container element has been moulded, the inner container element can be blow moulded within the outer container element supported by the interior wall of the vacuum mould.

Thus, the blow moulding operation can be performed while the outer container element is still hot. Consequently, the two container elements are firmly united and a strong laminate is formed. Finally, the method of the invention does not require a cooling operation of the outer container element because the latter should not be transferred into a holder prior to the formation of the inner container element.

The blow moulding operation is preferably carried out at a high pressure, i.e. about 10 ata, so as to bring the blow moulded container element in close contact with the vacuum moulded container element. Where the two container elements are made from compatible materials, the high pressure and the heat content of the blow moulded container element may cause a total or partial fusion of the two materials.

Since the two thermoplastic materials are introduced into the mould and formed in two separate steps, the waste material from these steps will not be mixed together. Accordingly, the waste material is suitable for regeneration.

The thickness of the plastics film which preferably is used in the vacuum moulding needs only be sufficient to impart to the product the desired barrier properties, the mechanical properties being provided by the blow moulded container material.

In a preferred manner of carrying out the invention, two vaccum mould halves are, in the first moulding step, closed upon an intermediary plate along the sides of which foil material for the moulding of the outer container element is fed, whereby blanks are cut from the foil material and shaped in the respective mould halves to lie closely against the walls thereof, whereafter the intermediary plate is removed and the mould halves are closed directly upon one another preparatory to performing the second moulding step.

To secure proper plasticizing of the foil material in the first moulding step, it is preferably heated to moulding temperature before being fed into the spaces between the intermediary plate and the mould halves.

Moreover, where the mould halves have neck opening portions, these are preferably closed by removable closing means during the first moulding step and are opened preparatory to performing the second moulding step. Thereby the leakage of false air into the mould cavities in the first moulding step is prevented and, at the same time, the clean cutting of blanks in the first moulding step is facilitated.

Where the most convenient way to provide the required barrier properties is to combine two or more materials which are different from the material which is to form the inner container element, the outer container element is preferably made from a laminate. An acrylonitrile/polypropylene laminate will be suitable in combination with an inner container element made from polyethylene. Furthermore, the outer container element may also be made from an aluminum/polyolefin film laminate. Examples of other polymers which alone or suitably combined can be used for the production of the outer container element are polycarbonates, polyvinylidene chloride, methacrylonitrile, polyamides, and polyolefins. In addition to polyethylene, polystyrene, polypropylene and acrylonitrile are suitable for the manufacture of the inner container element.

In another preferred embodiment of the method according to the invention, the thermoplastic material which is to be vacuum moulded is provided with a decoration. The container thus obtained will then be decorated without an additional process step being necessary. Such decoration is applied as a distorted print and will not appear in the proper dimensions until the container is finished. Since a film is used in the vacuum moulding step, it is possible to employ printing methods, e.g. photogravure, which cannot be utilized in connection with ordinary blow moulded containers.

The blow moulding operation may be an ordinary blow moulding process, an injection blowing process, or a so-called "dip-blow-method,". In the latter method the plastics material which is to be blown is preshaped around a blow mandrel by immersion of said mandrel in a liquid material. In an ordinary blow moulding process the blow moulded article is made from an extruded tube, whereas an injection blowing process comprises the injection of molten material in a preforming tool around a blow mandrel.

The invention also relates to a mould for carrying out the method. According to the invention, such a mould comprises two vacuum mould halves and an intermediate plate introducible between and removable from said mould halves, means for feeding foil material stepwise along the sides of said intermediate plate, said mould halves being closable upon said intermediate plate when it is present between the mould halves, and otherwise being directly closable upon one another.

DESCRIPTION OF THE PREFERRED EMBODIMENTS

Figure 1:
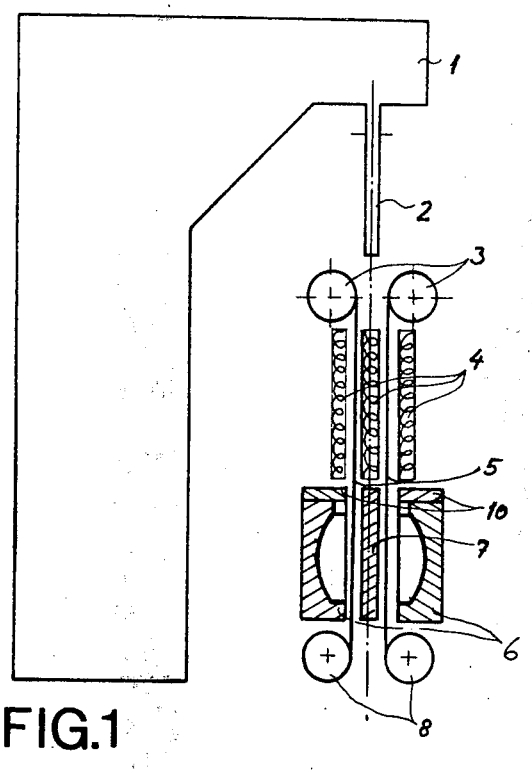
FIG. 1 is a diagrammatic side view of one example of equipment for carrying out the method according to the invention, including a mould according to one embodiment of the invention.
Figure 2:
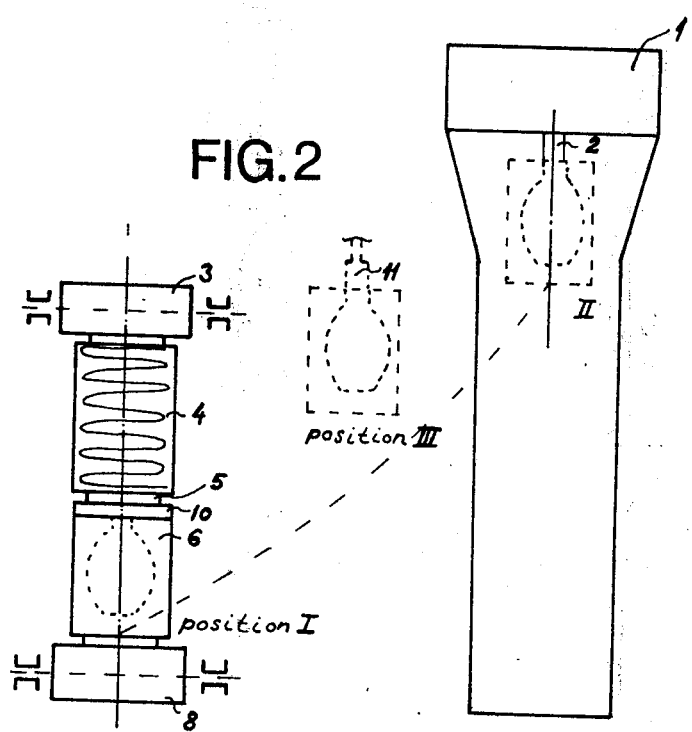
FIG. 2 is a diagrammatic front view of same.

FIGS. 1 and 2 show a blow moulding machine 1, that may be of conventional design, and from which a tube 2 of a first thermoplastic material is extruded. The figures also show a mould according to one embodiment of the invention comprising two mould halves 6 which are constructed with suitable passages making them usable for vacuum moulding in well-known manner when connected to a vacuum source, an intermediary plate 7 which in a first step of the method is located between the mould halves 6, and rollers 3 from which two sheets of a second plastic material in foil or film form are intermittently drawn along the sides of the intermediary plate 7. The foil is plasticized by heating means 4.

In the first step of the method, the two mould halves 6 are closed upon the intermediary plate 7 and subjected to vacuum, whereby the foils 5 are firmly held along the edges of the mould halves and are vacuum moulded to form outer container element halves lying closely against the walls of the mould cavities of the mould halves, air being admitted to the mould cavities on the inner sides of the foils through passages in the intermediary plate 7. Before, during or, preferably, after the vacuum moulding, the blanks forming the outer container element halves are cut out from the foils by means of the intermediary plate, e.g. by the application of ultrasound, or supplying heat through the intermediary plate, or using the intermediary plate as a counter member for a cutting tool.

For the purposes of the subsequent blow moulding step the mould has a neck opening formed by complementary opening portions of the two mould halves. In the first step, these opening portions are closed by means of a slidable bipartite closing plate 10 so that a closed space is formed between each foil portion and the corresponding mould half, and leakage of false air into these spaces is prevented. Besides, the closing plate assists in the clean cutting of the blanks from the foil portions.

After completion of the vacuum moulding step, the mould halves and the auxiliary assembly comprising the intermediary plate 7 and the foil feeding and heating means are separated from one another, and also the closing plate is removed, and the mould halves are then closed directly upon each other to perform the blow moulding step. As an example, as illustrated in FIG. 2, the mould halves may first be moved to a position II indicated by dotted lines where the mould halves are closed upon the extruded tube 2 whereafter the desired length of tube is cut off by means of a cutting knife. The closed mould is then moved to a position III likewise indicated by dotted lines in FIG. 2, where the blow moulding of the inner container element takes place by means of a blowing mandrel 11. Ejection of the finished container element likewise takes place in position III, whereafter the mould halves are returned to position I to start a new cycle.

It will be realized that the mould halves may be moved between the various positions in any desired paths by well-known mechanical means and that, as an alternative solution, the mould halves may remain stationary in which case the auxiliary assembly is removed from the mould halves, the length of hose 2 is conveyed to the position of the mould halves and the blowing mandrel is operative also in that position.

Figure 3:
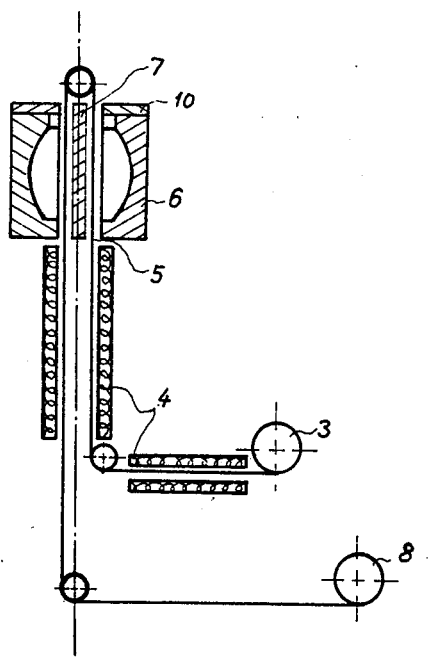
FIGS. 3 and 4 are diagrammatic side views of a mould according to another embodiment of the invention in two different positions.
Figure 4:
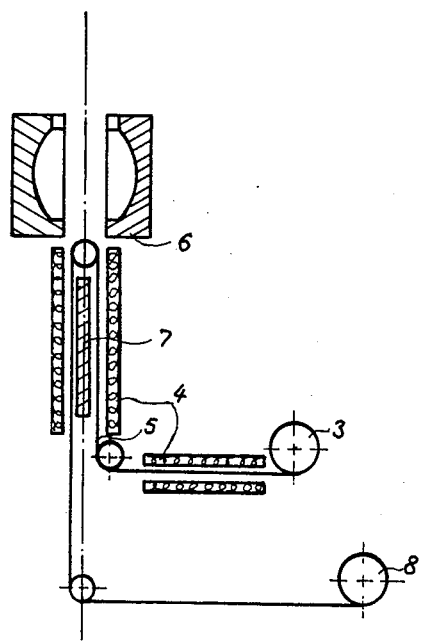

In the embodiment illustrated in FIGS. 3 and 4, the foil material is drawn from a single roller and is guided around the top of the intermediary plate, so that a run of the foil material is present on either side of the intermediary plate 7. In this embodiment the foil material is introduced between and withdrawn from the mould halves together with the intermediary plate 7, as illustrated in FIGS. 3 and 4 respectively, while the mould halves remain stationary and may be used for the blow moulding step as described in connection with the alternative solution mentioned above.

I claim:

1. A method of making a layered container consisting mainly of thermoplastic material comprising the steps of
    feeding foil material along each side of an intermediary plate forming part of a vacuum mould having two mould halves,
    closing each of the two mould halves of said vacuum mould upon the intermediary plate, thereby clamping foil material between each mould half and a corresponding side of the intermediary plate,
    cutting blanks from said clamped foil material substantially along the peripheries of said mould halves in contact with said foil material, applying a vacuum between each blank and the corresponding mould wall so as to shape the blanks in the respective mould halves into outer container elements lying closely against the walls of the mould halves, removing the intermediary plate from between the mould halves, closing the mould halves directly upon one another, forming by blow moulding an inner container element within the mould with the already moulded outer container elements present therein in close contact with the mould wall so as to provide a container composed of said inner and outer elements being in intimate contact with one another, and removing the container thus formed from the mould.

2. A method according to claim 1, further including the step of heating the foil material to moulding temperature prior to feeding the foil material along the sides of the intermediary plate.

3. A method according to claim 1, wherein neck opening portions of the mould halves are closed by removable closing means during the vacuum moulding step and are opened preparatory to performing the blow moulding.

4. A method according to claim 1, wherein the foil material is a laminate.

5. A method according to claim 1, wherein the foil material is provided with a decoration.

6. A method according to claim 1, wherein the step of blow moulding includes introducing a blow mandrel into the mould.

* * * * *